Jan. 2, 1968   I. JEPSON ET AL   3,361,053
ELECTRIC TOASTER
Original Filed July 7, 1964   6 Sheets-Sheet 1
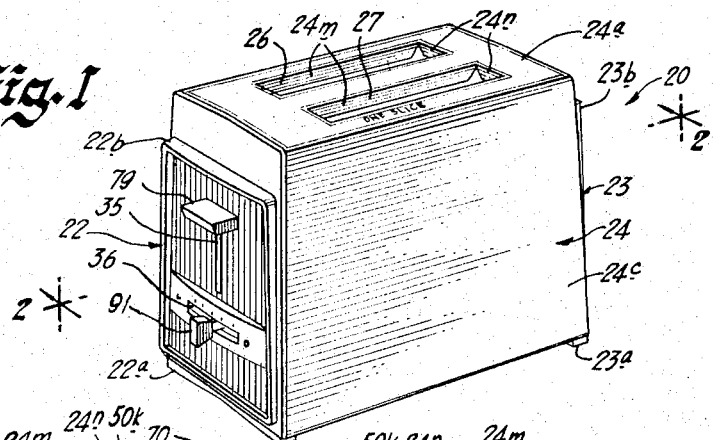
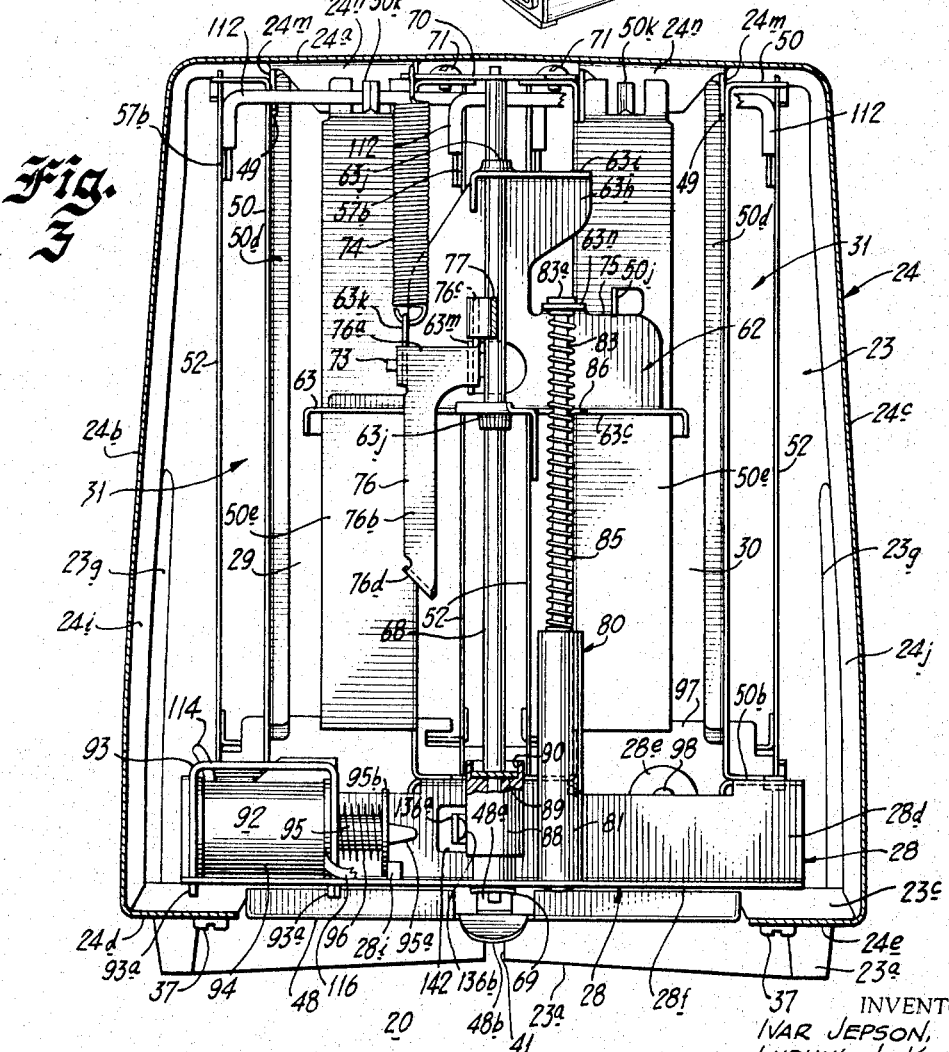
INVENTORS
IVAR JEPSON,
LUDVIK J. KOCI,
JOSEPH L. VIECELI AND
DOUGLAS F. ILLIAN
BY
George R. Clark ATT'Y.

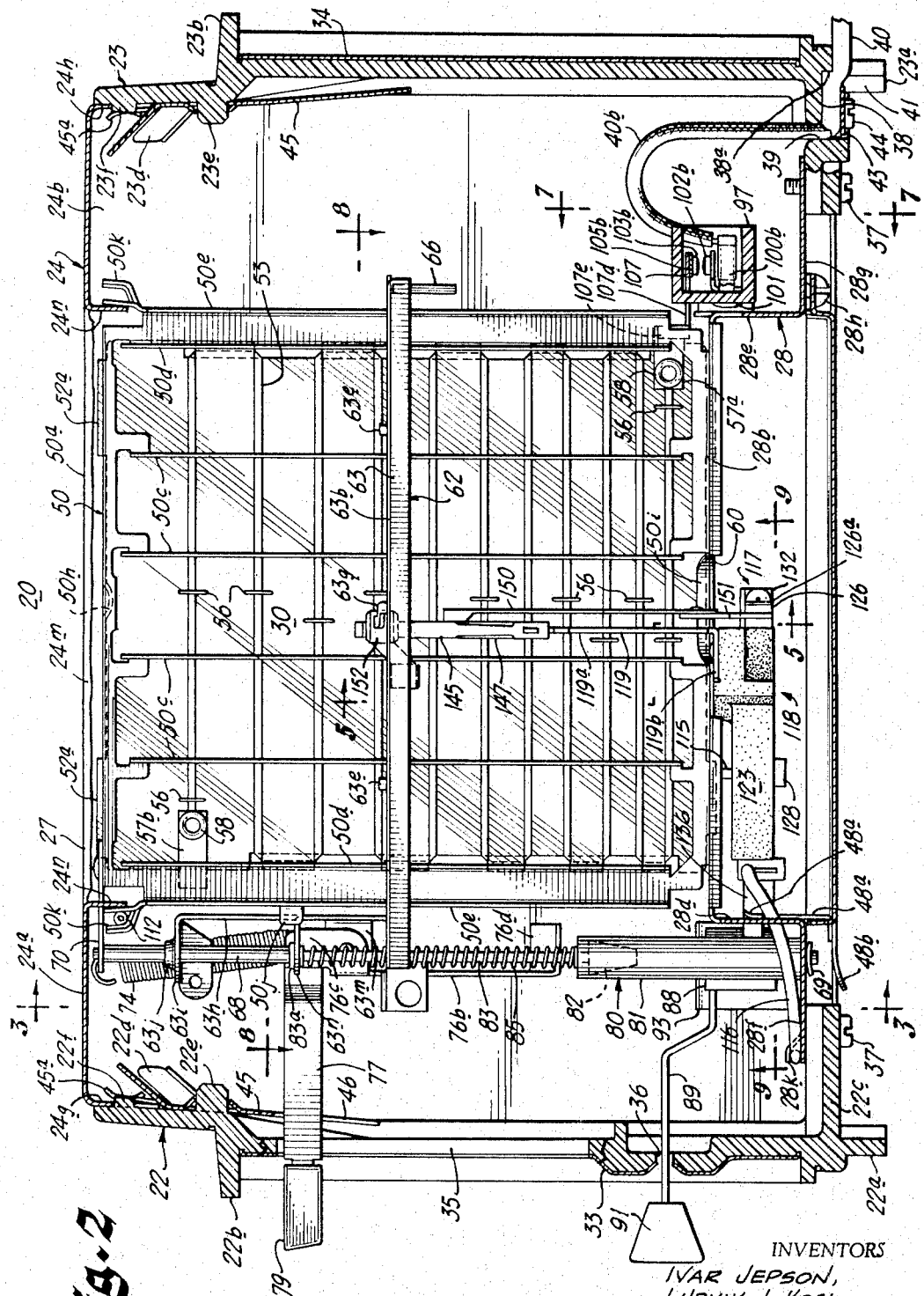

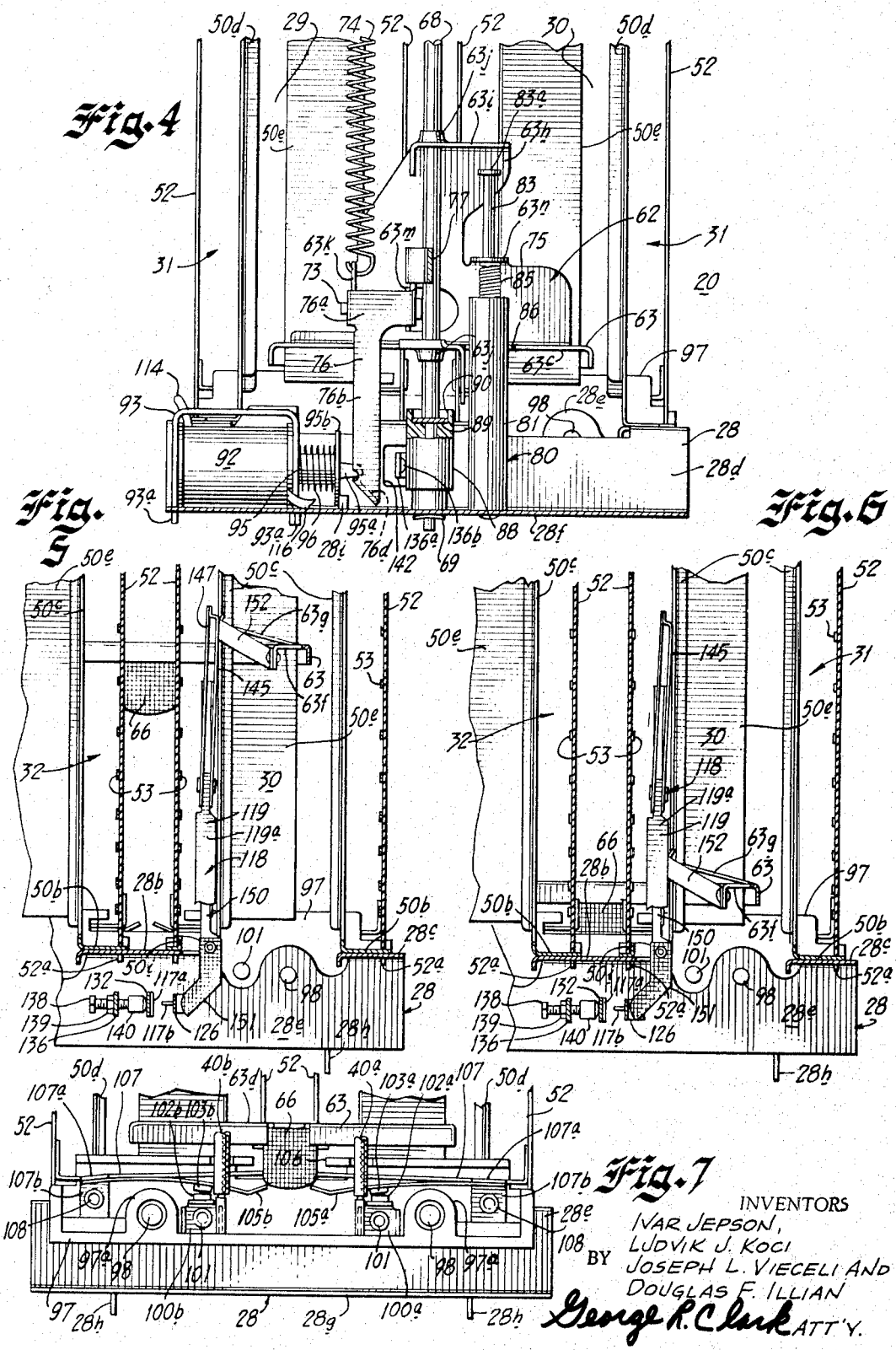

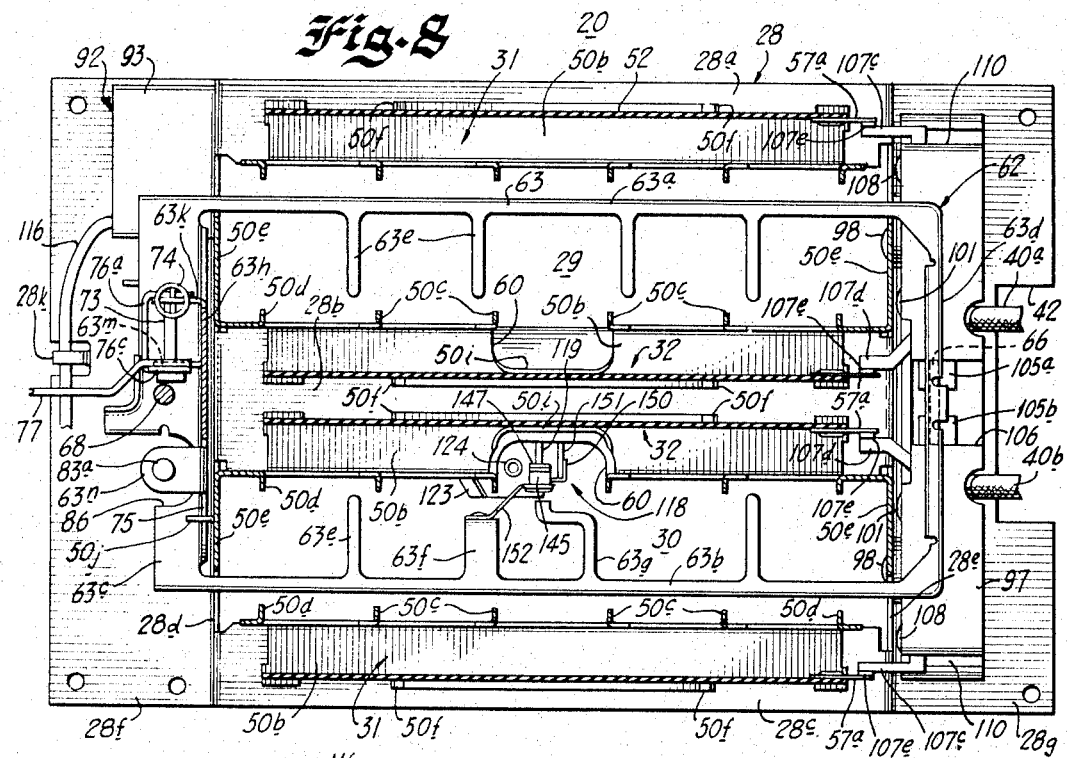
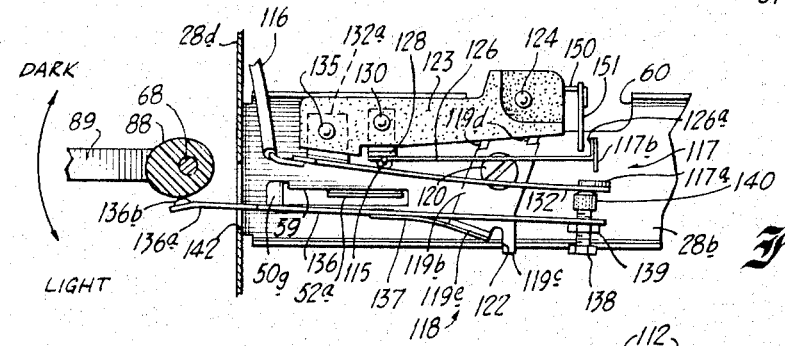
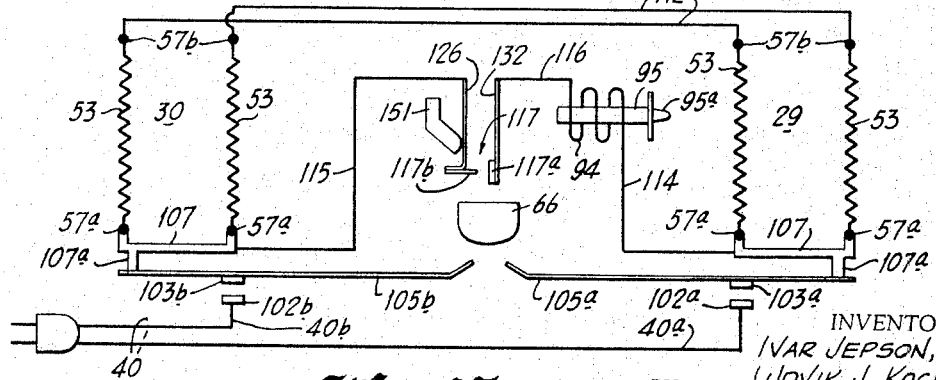

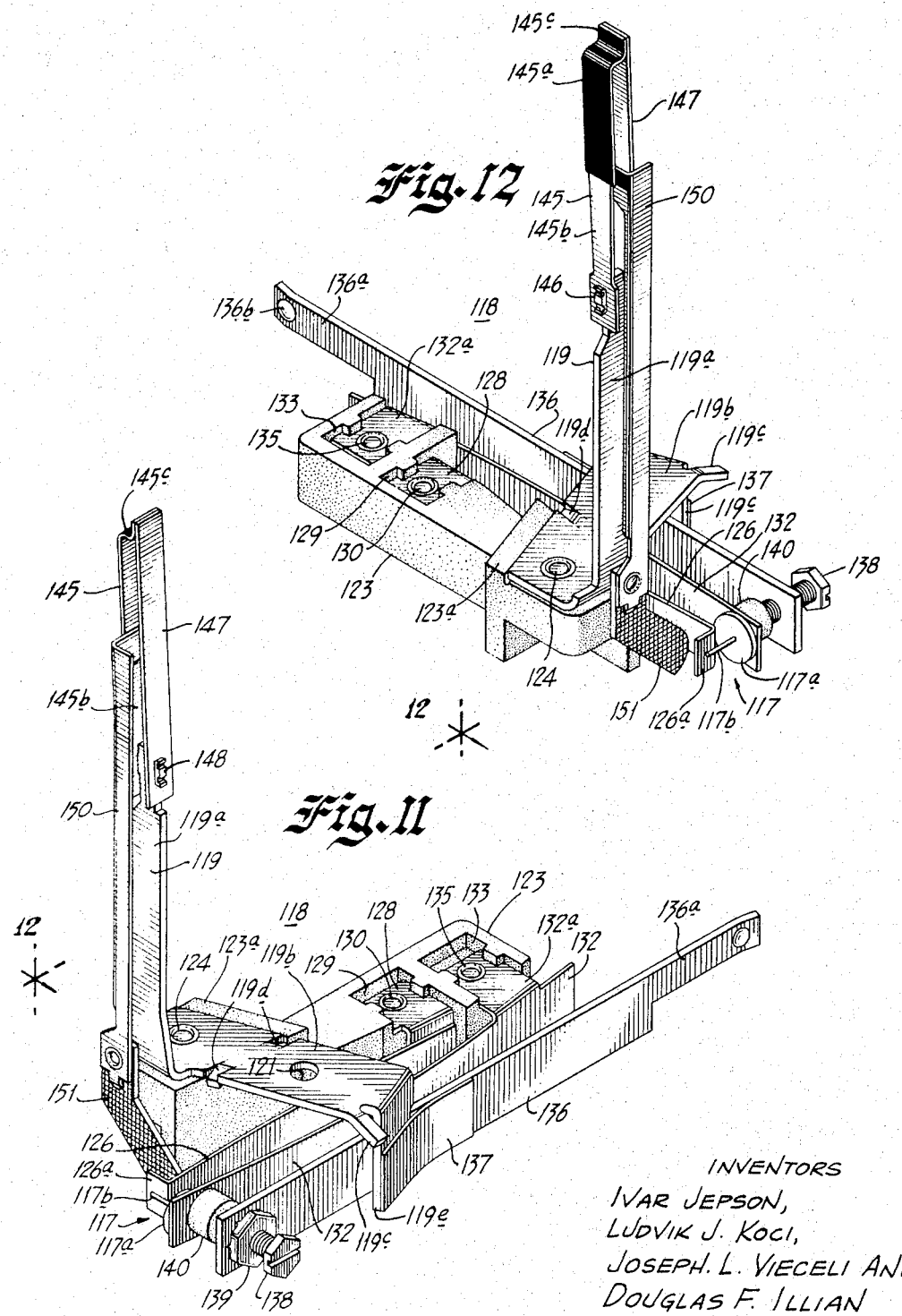

Jan. 2, 1968   I. JEPSON ET AL   3,361,053
ELECTRIC TOASTER
Original Filed July 7, 1964   6 Sheets-Sheet 6

INVENTORS
IVAR JEPSON,
LUDVIK J. KOCI,
JOSEPH L. VIECELI AND
DOUGLAS F. ILLIAN

BY George R. Clark ATT'Y.

United States Patent Office 3,361,053
Patented Jan. 2, 1968

3,361,053
ELECTRIC TOASTER
Ivar Jepson, South Duxbury, Mass., and Ludvik J. Koci, Hinsdale, Joseph L. Vieceli, La Grange, and Douglas F. Illian, Oak Park, Ill., assignors to Sunbeam Corporation, Chicago, Ill., a corporation of Illinois
Original application July 7, 1964, Ser. No. 380,822, now Patent No. 3,279,352, dated Oct. 18, 1966. Divided and this application Oct. 14, 1965, Ser. No. 495,902
8 Claims. (Cl. 99—329)

ABSTRACT OF THE DISCLOSURE

An electric toaster is provided having a thermostatically controlled shutoff switch including an upwardly extending bracket having an elongated bimetallic element having its lower end rigidly secured to the upper end of the bracket, and a combined restraining and shielding element having its lower end also secured to the upper end of the bracket and having its upper end secured to the upper end of the bimetallic element. The bimetallic element is disposed to receive radiant energy from a bread slice being toasted.

---

This application is a division of copending Jepson et al. application Ser. No. 380,822, filed July 7, 1964, and assigned to the same assignee as the instant application, now Patent No. 3,279,352 which issued Oct. 18, 1966. The present invention relates generally to electric toasters and more particularly to electric toasters of the semi-automatic or automatic type wherein the time interval during which the bread is toasted is selectively and automatically controlled to provide for repeated uniform toasting action of bread slices placed in the toaster.

Most automatic toasters of the type described include complicated and costly mechanisms for controlling the toasting action on bread slices placed in the toaster. Generally, these toasters include an arrangement wherein bread slices are inserted into the toaster on a bread carriage disposed between opposed facing heating elements of a toasting chamber. The bread carriage is then either manually or automatically moved downwardly to a toasting position wherein the bread is toasted to a desired degree or color and then is released automatically at the end of a selected toasting cycle to move upwardly in a pop-up action so that the toasted bread can be removed for consumption. In toasters of this type, automatic means generally are provided for selectively controlling the degree of toasting action so that subsequent bread slices placed in the toaster will be uniformly toasted.

One of the problems associated with toasters of this type is to obtain selected uniform toasting on subsequent bread slices placed in the toaster even though ambient temperature conditions in the toaster may change due to heating up of the toaster on previous toasting cycles. Consequently, it is highly desirable to provide automatic means for controlling the toasting cycle which means automatically compensate for the ambient temperatures within the toaster in order to provide uniform toasting on successive bread slices.

It is also desirable to provide a toaster of the type described wherein the outer housing enclosing the internal parts of the toaster is neat in appearance, compact in construction and can readily be assembled or disassembled for servicing the internal mechanism of the toaster. Along this line it is also highly desirable to provide a toaster of this type in which a minimum number of parts are required to facilitate mass production of these toasters while yet still achieving uniform quality standards and foolproof operation of these mass produced items.

Accordingly, it is an object of the present invention to provide a new and improved electric toaster of the type described.

Another object of the present invention is to provide a toaster which embodies the desirable features mentioned above.

More specifically, it is an object of the present invention to provide a new and improved compact, low cost, neat in appearance electric toaster which is easy to assemble and disassemble for servicing, which requires a minimum number of parts, and lends itself readily toward ease in mass production with uniform quality standards.

A further object of the present invention is to provide a new and improved toaster wherein the outer enclosure can be easily and rapidly disassembled without sacrificing the appearance of the toaster so that the internal structure within the toaster can be exposed for servicing.

Still another object of the present invention is the provision of a new and improved toaster wherein a large number of component parts thereof can be formed by a simple stamping operation from a continuous strip of sheet metal.

It is another object of the present invention to provide a new and improved toaster of the type described having new and improved heating units therein.

Yet another object of the present invention is to provide a new and improved toaster of the type described having new and improved means for thermostatically controlling the toasting action of the toaster to obtain uniformity of toasting action of successive bread slices toasted in the toaster.

It is another object of the present invention to provide a toaster of the type described having a new and improved automatic means for controlling the toasting action of the toaster in a manner to obtain uniform results even though ambient temperature conditions within the toaster may change between successive toasting cycles.

A still further object of the present invention is the provision of a toaster of the type described wherein the automatic means for controlling the toasting cycle is primarily responsive to the toasting action of the bread itself and is automatically compensated to obtain uniform toasting of successive bread slices even though ambient temperature conditions within the toaster may vary.

Yet another object of the present invention is the provision of a toaster of the type described having new and improved control means operable to reduce the time interval required between successive toasting cycles while still obtaining uniform toasting results on bread slices successively placed in the toaster.

Still another object of the present invention is the provision of the toaster of the type described having a new and improved heating unit therein which is formed with a minimum number of component parts and can be produced readily in mass production procedures.

It is another object of the present invention to provide a new and improved heating unit of the type described wherein a supporting frame member is integrally formed from a single piece of sheet metal in a stamping operation having bread guiding ribs and structure for supporting the heating element.

It is a further object of the present invention to provide a toaster of the type described having new and improved means for releasing the bread carriage to terminate a toasting cycle.

A still further object of the present invention resides in the provision of a toaster of the type described having new and improved means for terminating the heating cycle which means is relatively simple in operation and construction, low in cost and virtually foolproof.

Yet another object of the present invention is the provision of a toaster of the type described having new and improved means for releasing the carriage to terminate a bread toasting cycle which means includes automatic as well as manually operable mechanism to effect the release.

Further objects and advantages of the present invention will become apparent as the following description proceeds, and the features of novelty which characterize the invention will be pointed out with particularity in the claims annexed to and forming a part of this specification.

For a better understanding of the present invention, reference should be had to the following detailed description taken in conjunction with the accompanying drawings in which:

FIG. 1 is a perspective view of a new and improved toaster constructed in accordance with the features of the present invention with the carriage in its upper or non-toasting position;

FIG. 2 is a side elevational sectional view of the toaster of FIG. 1 taken substantially along the line 2—2 of FIG. 1 but with certain portions cut away more clearly to illustrate the invention;

FIG. 3 is a transverse sectional elevational view of the toaster of FIG. 1 taken substantially along the line 3—3 of FIG. 2 assuming that FIG. 2 shows the complete structure;

FIG. 4 is a fragmentary transverse sectional view of the toaster of FIG. 1 similar to that of FIG. 3 but with the shell removed and showing the toaster carriage as it is latched in its lower or toasting position during a heating cycle of the toaster;

FIG. 5 is a fragmentary sectional view of the toaster of FIG. 1 taken substantially along the line 5—5 of FIG. 2 assuming that FIG. 2 shows the complete structure;

FIG. 6 is a fragmentary sectional view similar to FIG. 5 but illustrating the bread carriage of the toaster in its lower or toasting position;

FIG. 7 is a fragmentary sectional view of the toaster of FIG. 1 taken along line 7—7 of FIG. 2 assuming that FIG. 2 shows the complete structure but with the bread carriage in its lower or toasting position to illustrate the switches for controlling the current to the heating elements;

FIG. 8 is a sectional plan view of the toaster of FIG. 1 taken substantially along line 8—8 of FIG. 2 but with the shell removed and again assuming that FIG. 2 shows the complete structure;

FIG. 9 is a fragmentary sectional view taken along line 9—9 of FIG. 2 again assuming that FIG. 2 shows the complete structure to illustrate in detail the color control selecting means of the toaster;

FIG. 10 is a schematic diagram illustrating the electrical circuit of the toaster of FIG. 1;

FIG. 11 is an enlarged detailed perspective view of the thermostatic control unit of the toaster of FIG. 1;

FIG. 12 is a similar perspective view of the thermostatic control unit of FIG. 11 viewed generally in the direction of the arrows 12—12 of FIG. 11.

Figure 13:
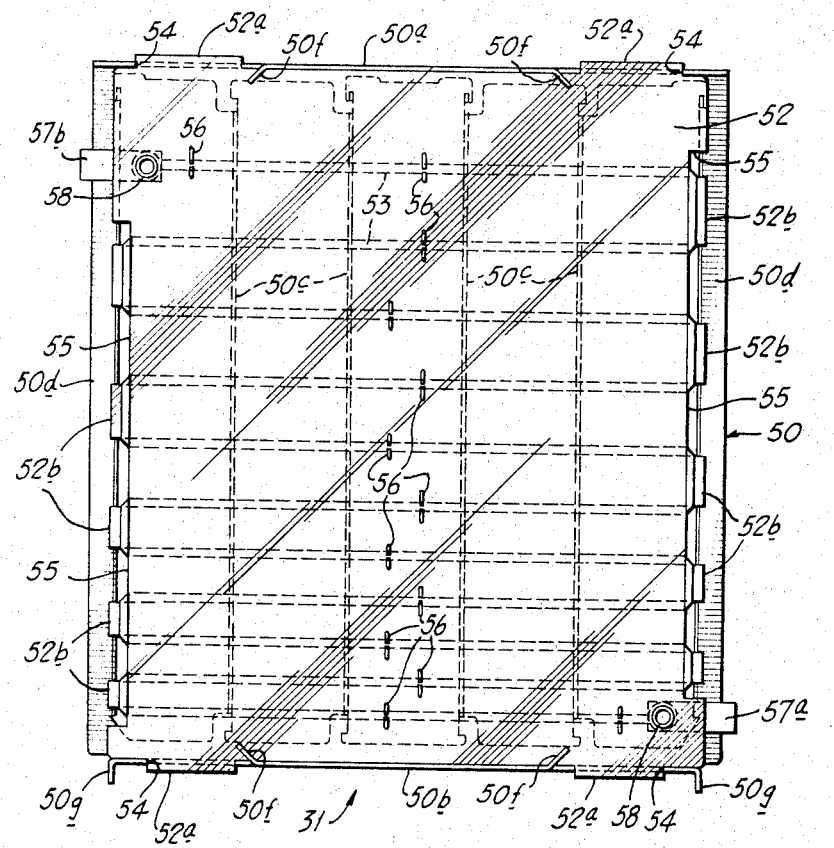
FIG. 13 is a partial elevational view of the back side of one of the outside heating units employed in the toaster of FIG. 1.

Briefly, the foregoing objects and advantages of the present invention are accomplished by the provision of an electric toaster including an outer enclosure formed with a pair of spaced apart molded opposite end panels each having a lower edge for supporting the toaster and each having an integrally formed inwardly extending base support flange spaced upwardly from the lower edge. A removable shell is provided to extend between the end panels forming therewith an enclosed toaster housing. A stamped base member for supporting the heating means of the toaster is supported by the support flanges on the end panels. Suitable frames are supported on the base and disposed in spaced apart relation forming a pair of bread receiving chambers therebetween, each pair of frames providing the opposing sides of the bread chambers. The end panels, shell, base and frames are secured to one another by means of a plurality of removable fasteners to provide a structure which may be rapidly and easily assembled or disassembled. Moreover, the shell and end panels may readily be removed to expose the internal mechanism of the toaster.

Another feature of the toaster of the present invention includes the heating units which form the side walls of the bread receiving or toasting chamber. These units include the frames referred to above, each formed of a single sheet of metal having a continuous peripheral edge. The top and bottom of this edge are interconnected by parallel strips formed integrally with the frame to form bread guides. These frames each support an insulating sheet having a heating element carried thereon.

Other novel features of the toaster, as will become apparent from the more detailed description, are the improved means for latching the movable bread carriage and the improved thermostatic control means which is primarily responsive to radiant energy received from the toasted bread slice.

Referring now to the drawings, there is illustrated a new and improved electric toaster constructed in accordance with the features of the present invention and referred to generally by the reference numeral 20. This toaster 20 includes an outer enclosure or housing defined by a pair of opposite end panels 22 and 23, an outer shell 24 of U-shaped cross section and a base member 28. The shell 24 comprises a top panel 24a and a pair of side panels 24b and 24c.

The top panel 24a of the shell 24 is provided with a pair of spaced elongated bread receiving slots 26 and 27 (FIGS. 1 and 2) which define the entrance to a pair of toasting chambers 29 and 30 (FIGS. 2, 3, 4 and 8) within the housing of toaster 20 whereby bread slices may be selectively inserted into the toasting chambers 29 and 30 for toasting. Each of the toasting chambers 29 and 30 is provided with spaced apart upstanding heating units 31 and 32 which define opposite sides of the chambers 29 and 30. The pairs of heating units 31 and 32 are supported on the base member 28 in a manner described hereinafter, and the upper ends of the units are secured in proper spaced apart relation to one another by engagement with depending flanges on top panel 24a of the shell 24, a feature which will be described more fully hereinafter.

The base 28 is illustrated as a somewhat U-shaped integral metal stamping with support flanges projecting from the legs of the U. As illustrated, it comprises a raised horizontal central portion defined by spaced elongated heating unit support members 28a, 28b and 28c all connected at the control end of the toaster to a vertical portion 28d and at the other end to a similar vertical portion 28e. Projecting from the lower end of vertical portions 28d and 28e are horizontally disposed support flanges 28f and 28g, respectively.

The end panels 22 and 23 are preferably constructed of molded plastic material such as phenolic resin or the like and are provided with lower depending portions 22a and 23a, respectively, defining legs for supporting the toaster from a table or counter top. The outer faces of the end panels 22 and 23 may be provided with integrally molded decorative features such as outwardly projecting flanges 22b and 23b, respectively, (FIGS. 1 and 2) defining a sort of rectangular frame to house a decorative escutcheon plate of brushed aluminum or the like mounted against the outer face of the respective panel. These flanges 22b and 23b also serve as heat insulating handles for transporting the toaster 20. As illustrated, the control end of panel 22 is provided with an escutcheon plate 33 and the other end panel 23 is provided with a decorated escutcheon plate 34. Preferably, these escutcheon plates 33 and 34 are provided with tabs which may extend through openings in the panels for securing these plates in position.

In order to permit suitable controls to extend therethrough, the control end panel 22 and escutcheon plate 33 are provided with aligned openings defining vertically extending central slot 35 (FIGS. 1 and 2) for accommodating vertical movements of the actuating arm of a carriage control mechanism of the toaster described in detail hereinafter. The panel 22 and escutcheon plate 33 are also provided with aligned openings defining a horizontally disposed slot 36 for accommodating the horizontal movements of a selector arm of a color control mechanism for the toaster 20, also described hereinafter. So that the particular setting of the color control mechanism is apparent to the user, the escutcheon plate 33 on the end panel 22 is preferably provided with appropriate indicia such as the letter "L" or word "LIGHT" at one end of the slot 36, the letter "D" or word "DARK" at the other end of this slot and suitable numbers or the like to indicate the various gradations disposed along this slot.

For the purpose of supporting the base member 28 and to insure ease of assembly and disassembly, the end panels 22 and 23 are provided with integrally formed, inwardly directed base support flanges 22c and 23c, respectively, which are provided with suitable openings to receive fastening means for securing the base 28 and the shell 24 to these end panels. The support flanges 28f and 28g of the base member 28 are supported on the flanges 22c and 23c, respectively. To secure the shell 24 to the base 28, the side panels 24b and 24c thereof are provided with inturned lower edge flanges 24d and 24e, respectively, (FIG. 3) which are disposed to confront lower surfaces of the base support flanges 22c and 23c of the respective end panels 22 and 23. Suitable fastening means such as self-tapping screws 37 are provided at each corner of the toaster 20 to secure together the base support flanges 22c and 23c of the end panels 22 and 23, the support flanges 28f and 28g of the base member 28 and the flanges 24d and 24e of the shell 24 to form the base and housing assembly of toaster 20. Thus, by simply removing the four screws 37 and deflecting the lower edges of the side panels 24b and 24c of shell 24 outwardly, the latter can be removed from the end panels and base member to expose the internal mechanism of the toaster 20.

In order to accommodate a suitable power cord for supplying electrical energy to the toaster as well as a strain relief for such cord, the underside of the base support flange 23c of the end panel 23 is provided with a centrally disposed downwardly opening recess 38 (FIG. 2) which is provided with an opening 39 through which a conventional power cord 40 (FIGS. 2 and 10) may pass. The leg portion 23a of panel 23 is provided with a cord receiving notch 41 (FIGS. 2 and 3). Thus, power cord 40 may extend from outside end panel 23 through notch 41 into recess 38 and thence through opening 39 and through a notch or cut out portion 42 (FIG. 8) in flange 28g of base 28 to the space within the toaster housing above base 28. In order to prevent the exertion of an excessive strain on the terminals of the toaster 20, there is provided a strain relief means comprising a clamping member 43 receivable in recess 38 to clamp the power cord 40 against the top wall defining recess 38. Suitable screws 44 are provided to secure clamping member 43 in its clamping position. Preferably a step or shoulder 38a (FIG. 2) is provided against which cord 40 is clamped.

For the purpose of interlocking the upper portions of the shell 24 and end panels 22 and 23 to form a strong, rigid housing for the toaster and also to shield these molded end panels, a pair of identical clip members 45 (FIG. 2) are provided, one secured to the inside face of each of the respective end panels 22 and 23. The clip members 45 are jam-mounted in their proper position on projecting pairs of bosses 22e and 23e integrally formed with the respective end panels 22 and 23. The bosses are disposed to project through appropriately aligned jam-nut type openings formed in the clip members 45 when the clip members are positioned in place on the end panels. Each of the clip members is provided with a central notch 46 in the lower edge thereof so that if associated with control end panel 22 it will be aligned with vertical slot 35.

The clip members 45 are formed with upwardly extending inwardly deflectable resilient fingers 45a for engaging down-turned centrally disposed end flanges 24g and 24h formed at opposite ends of the top panel 24a of the shell 24. The end panels 22 and 23 are also provided with an integral boss 22d and 23d, respectively, to provide limit stops for the resilient fingers 45a. For proper orientation of the shell, as described hereinafter, the flange 24g at the control end is substantially wider than the flange 24h at the other end. The flanges 24g and 24h are adapted for engagement between the inner faces of the end panels 22 and 23 and the adjacent fingers 45a of the respective clip member 45 when the shell is in an assembled position thus locking together the upper portions of the shell and the end panels. Additionally, spaced apart pairs of orientation bosses 22f and 23f are provided near the top on the inner faces of the respective end panels 22 and 23 for insuring proper orientation of shell 24. The bosses 22f are spaced farther apart than bosses 23f, and the wide flange 24g cannot be accommodated between bosses 23f thus assuring proper orientation of shell 24. This orientation is necessary since preferably indicia are provided on the shell to indicate which toasting chamber 29 or 30 is to be used when only a single slice is to be toasted, and as will become apparent from the ensuing description, the thermostatic control means responds to the condition of only one slice of bread, namely, that in toasting chamber 30.

To provide further strength for the assembled housing of the toaster 20, the side panels 24b and 24c of the shell 24 are provided with vertically extending inturned end flanges 24i and 24j, respectively (FIG. 3). The flanges 24i and 24j are adapted to bear against the inner faces of the end panels 22 and 23 and against suitable shoulders defined by upwardly extending ribs 22g and 23g, respectively (23g shown in FIG. 3), integrally formed with these end panels for preventing inward lateral movement of the side panels 24b and 24c relative to the end panels 22 and 23 after the shell 24 is in place.

It can thus be seen from the foregoing description that the end panels 22 and 23, base member 28 and shell 24 are easily assembled together to form a strong external housing for the toaster 20 which is neat in appearance. The shell 24 is easily interlocked into position between the end panels 22 and 23, and when disassembly is desired, only the screws 37 need be removed before the shell can be separated from the end panels. Moreover, the shell cannot be assembled with the end panels when not correctly orientated, and thus any possibility of improper assembly is precluded. Once the shell 24 has been removed from the end panels 22 and 23, the panels 22 and 23 can easily be separated from the base member 28 if desired.

Considering the base member 28 in more detail, the spaced parallel elongated heating unit support members 28a, 28b and 28c support the pairs of upstanding heating units 31 and 32. As illustrated, the center member 28b has downturned edges (FIGS. 5, 6 and 9) so as to be somewhat channel shaped for increased rigidity, and it supports the two centrally disposed, upstanding heating units 32 in back-to-back relationship. The outer heating unit support members 28a and 28c also have an edge flange for increased rigidity and they each support one of the outer heating units 31. The spaces between heating unit support members 28a and 28b and between heating unit support members 28b and 28c are disposed directly beneath the toasting chambers 29 and 30, respectively.

In order to receive crumbs and toasted particles which may fall from the bread slices placed in the toasting chambers 29 and 30, there is provided a removable crumb tray 48 which is disposed to underlie the raised central section of the base member 28 defined by spaced heating unit support members 28a, 28b and 28c. The crumb tray 48 is pivotally attached at one end to the end flange 28g of the base member 28 by means of depending hinge lugs 28h (see FIGS. 2, 5 and 6). The hinge lugs 28h are provided with upwardly extending slots having enlarged circular blind ends into which trunnion portions integral with the crumb tray 48 are first inserted when the tray is parallel to the longitudinal axis of the slots, after which the crumb tray 48 may be pivoted to the closed position as shown in FIG. 2 underlying the base member 28. The mounting means for the crumb tray are more fully disclosed and claimed in a copending Swanson application, Ser. No. 381,836, filed July 10, 1964, and assigned to the same assignee as the instant application, now Patent No. 3,256,805 which issued June 21, 1966. The other end of the crumb tray 48 is provided with an upstanding spring latch finger 48a attached to a forwardly extending handle or tab 48b, the latter being utilized to grasp the forward portion of the crumb tray to move it downwardly to unlatch the spring latch finger 48a and remove the tray if desired for emptying. The latch finger 48a is engageable with the lower edge of a suitable opening (not shown) provided in the vertical section 28d of the base member 28 when the tray 48 is latched in the closed position as shown in FIG. 2 of the drawings. Preferably, the crumb tray is provided with suitable ventilating openings (not shown).

The heating units 31 and 32 which define the opposed side walls of the toasting chambers 29 and 30 are very similar, the outer two heating units 31 being counterparts or mirror images of each other, and the two center heating units 32, mounted in back-to-back relationship, being manufactured as counterpart units and essentially the same as the heating units 31. Accordingly, the corresponding parts which are similar will be designated by the same reference numerals and only one heating unit will be described in detail.

Referring now particularly to FIGS. 2 and 13, where a side elevational view of the heating side of heating unit 32 is shown in FIG. 2 and the back side of the heating unit 31 is shown in FIG. 13, each heating unit includes a rectangular frame 50 with a continuous periphery and a plurality of spaced parallel cross members, all formed as a single sheet metal stamping. Each frame 50 comprises a horizontally disposed top member 50a and a bottom member 50b. In an embodiment built in accordance with the present invention, the top and bottom members comprised a flat strip of sheet metal of the order of one-half inch in width disposed in a horizontal plane, with a downturned edge on top member 50a and an upturned edge on bottom member 50b on the heating sides thereof interconnected by a plurality of integral spaced parallel connecting members or ribs 50c and 50d defining bread guides. The end bread guides are designated as 50d, and for the outer heating units 31 are of L-shaped cross section to provide increased rigidity since they function both as the frame edge and as bread guides. The bread guides 50c, on the other hand, are narrow, relatively thin metal strips with the plane of the strips perpendicular to the surface of the bread slice, as best shown in FIG. 8 of the drawings. The integral construction of ribs 50c and 50d with the remainder of frame 50 eliminates the need for separate guide wires and additionally adds to the overall strength of the frame. In the case of center heating units 32, the end bread guides 50d are provided with an L-shaped extension 50e (FIG. 8), thereby providing projecting lateral flanges defining carriage guides at each corner of the back-to-back center heating elements, the detailed function of which is described in greater detail hereinafter. For purposes described hereinafter, the ribs 50d and at least some of the ribs 50c project slightly above the junction with top frame 50a and are provided with notches or locking recesses 49, best shown in FIG. 3 of the drawings.

The frames 50 of each heating unit 31 and 32 are each adapted to support an associated insulating member 52 which, in turn, supports an electric heating element 53.

As illustrated, insulating member 52 is a mica sheet having upper and lower spaced projecting tabs 52a receivable in cooperating notches 54 defined in the back edges of both the top and bottom frame members 50a and 50b, as best shown in FIG. 13 of the drawings. To hold the insulating sheet 52 in assembled relationship with the frame 50, the latter is preferably provided with bend tabs 50f at the edges of the notches 54, which, of course, retain the insulating members 52 in position. The side edges of each insulating sheet 52 are provided with projections 52b defining a plurality of notches 55, some wide and some narrow, as best shown in FIG. 13 of the drawings, to permit electric heating element 53 to be supported thereon in the desired configuration. In an embodiment built in accordance with the present invention, the electric heating element 53 of each heating unit 31 and 32 comprised a resistance wire in ribbon form which, starting from the top by way of example and particularly with reference to FIG. 2 of the drawings, extends across the heating side of its associated heating unit, then around the uppermost projection 52b, back across the other side, around the projection 52b on that edge, and then back and forth until the bottom of the sheet is reached thereby providing a plurality of parallel lengths of ribbon resistance element across the heating side of insulating member 52. For uniform heating of the bread slices being toasted in toaster 20, the spacing between the lengths of resistance wire 53 extending across sheet 52 decreases going from top to bottom, as clearly shown in FIG. 2 of the drawings. The resistance wire is effectively zig-zagged back and forth across the sheet. To support the ribbon wire 53 at intermediate portions thereof and at the ends to prevent sagging, preferably a plurality of staples 56 or other fastening means are employed to clamp the same to the sheet 52. The ends of the heating element 53 are connected to suitable electric terminals 57a and 57b which are electrically connected to the ends of the heating elements and mechanically supported to the insulating member by suitable eyelet fastening means 58. The terminals 57a and 57b are on opposite side edges of the insulating sheets 52 and are disposed one near the bottom of the sheet and the other near the top. As specifically illustrated, the terminals 57a are disposed near the bottom of each heating element, while the terminals 57b are disposed near the top of each insulating support 52. These terminals 57a and 57b are conductive strips projecting from the edges of sheet 52 parallel to the plane of the sheet.

For the purpose of securing the heating units 31 and 32 to the base 28 in spaced parallel relationship to define the toasting chambers 29 and 30, the bottom frame members 50b of each heating unit are provided with bend tabs 50g receivable in cooperating openings defined in the base 28. Specifically and as best shown in FIG. 9 of the drawings, the center heating element support 28b is provided with T-shaped slots 59, and the bend tab 50g extends through the head of this T-shaped opening 59. When the bottom frame members 50b of the two center heating units 32 are in face-to-face engagement with the top of support 28b, the projecting portions of tabs 52a of insulating sheets 52 may extend into the legs of the T-shaped slots 59, as clearly shown in FIG. 9. Identical T-shaped slots 59 are provided in each of the heating unit support members 28a and 28b for receiving the bend tabs 50g of heating units 31 and also to accommodate the tabs 52a of their associated insulating sheets 52. For accurate positioning of the center heating elements 32, particularly where adjacent the radiant temperature responsive device described hereinafter, it is desirable that the center portion of the associated insulating sheet 52 be held in a predetermined horizontal position relative to the associated toasting chamber. To this end, the upper frame member 50a for this particular unit, as best shown in FIG. 2 of the drawings, is provided with a downwardly extending boss 50h providing a shoulder against which the upper center portion of the face of sheet 52 engages.

Similarly, to support the lower center portion and to engage the face thereof, an upwardly directed flange 50i is provided surrounding a recess 60 defined in both the lower frame member 50b of this heating element and the base portion 28b (FIGS. 8 and 9), the purpose of which notch or recess 60 will become apparent from the ensuing description.

The upper portions of the heating units 31 and 32 are interlocked with the shell 24 for proper positioning thereof. To this end the top panel 24a of the shell 24 having the bread receiving openings 26 and 27 therein is provided with depending flanges 24m and 24n surrounding each of the openings 26 and 27, as clearly shown in FIGS. 1, 2 and 3 of the drawings. The depending flanges 24m on the side edges of the openings 26 and 27 are received within the notches 49 of the heating units 31 and 32 thereby interlocking the shell 24 with the upper ends of the frames 50. The depending flanges 24n at the ends of the bread receiving slots 26 and 27 (FIGS. 1 and 2) also engage the upper ends of the frame portions 50e thereby insuring proper positioning of these frame portions which function as bread carriage guides for the bread carriage or rack described hereinafter.

From the foregoing description it can be seen that the heating units 31 and 32 which form the opposite side walls of the toasting chambers 29 and 30 are simple in construction and easily replaceable if needed. Moreover, the mica sheets 52 can easily be replaced on the frames 50 and the interlocking of the upper ends of the frames and the top panel 24a of shell 24 provide for simplicity of construction and assembly of the toaster and reduction of the cost.

In order to support bread slices within the toaster and to move such slices from toasting to nontoasting position and vice versa, there is provided a bread carriage mechanism 62 which is movable between an upper bread receiving position, as shown in FIGS. 2, 3 and 5 of the drawings, and a lower toasting position, as shown in FIGS. 4, 6 and 7 of the drawings. In the latter figures, the bread slices are adapted to be disposed within the toasting chambers 29 and 30 with opposite sides of the bread slices facing the heating units 31 and 32 of each chamber. The carriage mechanism 62 includes a horizontally disposed bread supporting rack 63 formed from a single piece of sheet metal stamped into the desired form and shaped as best shown in FIG. 8 of the drawings. As illustrated, rack 63 is in the form of an open rectangular frame having side members 63a and 63b and end members 63c and 63d. The side members 63a and 63b extend through the toasting chambers 29 and 30, respectively, and the hollow frame (which rack 63 comprises) surrounds the flanges 50e of the frames 50 (FIG. 8) of the center heating units 32 thereby to guide vertical movement of rack 63. For rigidity, the side members 63a and 63b of rack 63 are preferably of L-shaped cross section. In order to provide engagement with the bottom edge of the bread slices to be toasted for supporting the same, each side member 63a and 63b is provided with a plurality of inwardly directed fingers. In the case of side members 63a, a plurality of identical fingers 63e are provided, as clearly shown in FIG. 8 of the drawings. In the case of side members 63b, the end fingers are designated as 63e and are identical with those associated with side members 63a. However, a pair of additional fingers 63f and 63g are provided which perform a dual function, as described in greater detail hereinafter.

To perform a switch actuating function described in greater detail hereinafter, the end member 63d of rack 63 supports an insulating switch actuating member 66 (FIGS. 2, 7 and 8). In a device built in accordance with the present invention, switch actuating member 66 was a T-shaped insulating member with the head of the T inserted and clamped within the channel defined by end frame 63d, which was of channel-shaped cross section. The leg of the T was a downwardly depending extension, as best shown in FIG. 2 of the drawings. Preferably, bend tabs, not shown, integrally formed with rack 63 hold the insulating switch actuating member 66 in assembled relationship.

For the purpose of guiding, moving and controlling the bread rack 63, the end member 63c is much more elaborate than the other portions defining the hollow rectangular bread rack. As best shown in FIGS. 2, 3 and 4 of the drawings, the end member 63c comprises a sort of horizontal shelf portion from which there extends upwardly a vertical wall portion 63h terminating at the top in a horizontal projection 63i which is in spaced parallel relationship with the shelf portion 63c. The shelf portion 63c and the projection 63i are provided with aligned openings through which extends a carriage support post or elevator shaft 68. In a device built in accordance with the present invention, the upper and lower ends of the shaft or post 68 were of reduced cross section, and the lower end was inserted into an opening in base flange 28f and secured thereto by any suitable fastening means, such as 69 (FIGS. 2, 3 and 4). The upper end of shaft or post 68 is disposed in an opening defined in a top plate 70 which is secured as by fastening means 71 (FIGS. 2 and 3) to the central heating units 32. Top plate 70 projects beyond the edges of these heating units in spaced parallel relationship with the portions 63c and 63i of the bread rack 63. Preferably, the portions 63c and 63i of the rack 63 are provided with integral sleeve portions designated as 63j (FIGS. 3 and 4) surrounding the openings for the post 68 to guide the carriage in its vertical movement and to hold it in a nontilting manner.

For the purpose of supporting in a pivotal manner a suitable carriage latch, the bread rack 63 is provided with spaced vertically disposed projections 63k and 63m for supporting a horizontal pivot pin 73. In order constantly to bias the carriage or bread rack 63 to the upper or nontoasting position, there is provided a carriage return spring 74, which is illustrated as a tension spring having one end engaging a suitable opening in projection 63k and the other end engaging a suitable opening in top plate 70, as clearly shown in FIGS. 2 and 3 of the drawings. With this arrangement the tension spring continually biases the carriage to the upper position shown in FIGS. 2 and 3 of the drawings.

To limit the maximum upward movement of the carriage under the force of carriage return spring 74, an integral projection 50j is struck from the flange portion 50e of inner heating unit 32 defining the toasting chamber 30 which, as is clearly shown in FIG. 3 of the drawings, engages a shoulder 75 defined by the top edge of the vertical portion 63h. Thus, member 50j is a stop member limiting the upward movement of the bread rack 63.

In order manually to move the carriage to its toasting position and to terminate manually the toasting position at any time, there is provided a latching member 76 and a carriage moving and latch actuating member 77. The latching member 76, as best shown in FIGS. 3 and 8 of the drawings, comprises a U-shaped portion 76a at its upper end and a depending latching portion 76b extending downwardly from the U-shaped portion 76a. The legs of the U-shaped portion 76a define hinge members for receiving the pivot pin 73 supported by the vertical projections 63k and 63m. To manually control the latching member 76, it is provided with an upwardly directed portion 76c to which is secured by welding or in any other suitable way, the actuating member 77. This actuating member is adapted to extend through the vertical slot 35 in the end panel 22 described above so that the carriage may be actuated from the exterior of the housing of toaster 20. Preferably, a knob 79 (FIG. 1) is secured to the free end of the actuating member 77. The depending portion 76b of the latching member 76 engages the horizontal shelf portion 63c so that with downward pressure on the knob 79 the actuating member 77 effectively becomes an integral extension of the carriage or bread rack 63, whereby with continued downward force applied to knob 79 the carriage 63 will move toward the toasting position against the bias of tension spring 74. In order to perform a latching function, as described hereinafter, the free end of latching member 76 is provided with an angularly disposed lateral projection 76d (as best shown in FIG. 2 and 3 of the drawings) for cooperating with a suitable latch, described hereinafter. The lower end of latching member 76 acts as a stop to limit the maximum downward movement of bread rack 63. This is because the lower end of latching member 76 engages the horizontal flange 28f of base 28 upon maximum downward movement, as will be readily apparent from FIG. 4 of the drawing.

For the purpose of controlling the vertical movements of the bread rack 63, there is provided a conventional spring and dash pot mechanism generally designated at 80. As illustrated, the dash pot comprises a cylinder 81 open at the upper end with the lower end secured to the flange 28f of base 28 (FIGS. 2, 3 and 4). The conventional dash pot plunger 82, reciprocally movable within the cylinder 81, is connected to a plunger rod 83. As illustrated in the drawings, the plunger rod 83 extends through an opening in a projection 63n and the upper end of the plunger rod 83 is provided with an integral enlargement 83a so that the rod 83 can move downwardly relative to projection 63n only until the head 83a engages this projection, this position being shown in FIG. 2 of the drawings. If desired, a coiled compression spring 85 may be provided which surrounds the plunger rod 83 and is disposed between the plunger 82 and the underside of the projection 63n. To accommodate the plunger rod and spring and also the cylinder 81 when the latter is in its lowermost position, shown in FIG. 4 of the drawings, the shelf portion 63c is provided with a notch 86, best shown in FIGS. 3, 4 and 8 of the drawings. It will be apparent that when the carriage is in its uppermost position shown in FIG. 2 of the drawings, the plunger 82 will have been pulled to its uppermost position by virtue of the head 83a being in engagement with the projection 63n, the dash pot slowing down and steadying the motion of the carriage. Upon downward movement of the carriage, the projection 63n is free to move relative to the plunger 83.

Before considering the electrical circuit and control means for controlling the heating operation of the toaster 20, a brief description of a portion of the color control mechanism will be included here. To this end there is provided a color control cam 88 pivotally mounted to the lower end of carriage support post or elevator shaft 68. In a device built in accordance with the present invention, the cam 88 comprised an insulating cylindrical member, having a predetermined outer configuration, pivotally mounted about the vertical axis of post 68. In order to pivot cam 88 about this axis, there is provided an actuating lever 89 suitably secured to the upper end of the cam 88, as by being disposed within a groove 90 defined in the top of cylindrical cam 88 (FIGS. 3 and 4 of the drawings). Preferably, the end of lever 89 secured to cam 88 is also provided with an opening to receive the post 68. So that the lever 89 may be actuated from the exterior of the housing of the toaster 20, it projects through the horizontal slot 36 defined in end plate 22 and preferably also an actuating knob 91 (FIGS. 1 and 2) is secured to the end of lever 89.

For the purpose of latching the bread carriage or rack 63 in its lower or toasting position shown in FIG. 4 of the drawings, there is provided a solenoid latch mechanism, generally designated at 92. This solenoid latch mechanism comprises a U-shaped support frame 93, the legs of which are provided with projections 93a (FIGS. 3 and 4) which extend through openings in base flange 28f, thus suitably securing the support or mounting frame 93 thereto. The solenoid mechanism 92 includes the conventional solenoid winding 94 (FIGS. 3 and 10) supported by frame 93 having axially movable armature 95.

The latching portion of the armature 95, designated at 95a, is of somewhat conical configuration and is adapted to engage the latching projection 76d of latching member 76. In order to bias the latching armature 95 into latching position, a suitable compression spring 96 is provided, interposed between a washer or flange 95B, secured to the armature 95 and one leg of the U-shaped frame 93, as clearly shown in FIGS. 3 and 4 of the drawings. To limit the maximum movement of latching armature 95 toward the latching position, there is provided a stop 28i (FIG. 3) struck from the flange portion 28f and integrally formed therewith. It will be apparent that when the angularly disposed latching portion 76d engages the conical portion 95A of latching armature 95 upon downward movement of the carriage 63, it will cause the armature 95 to retract until the latching portion 95a thereof can move about the projection 76d, whereupon the carriage will be latched in its lowermost position. It will readily be apparent that upward movement of the knob 79 will move latching member 76 out of engagement with solenoid armature 95, whereupon the carriage 63 will move upwardly under the bias of tension spring 74.

For the purpose of supplying electrical energy to the heating elements 53 and the solenoid winding 94, there is secured to the vertical portion 28e of base 28, as best shown in FIGS. 2, 7 and 8 of the drawings, an elongated insulating terminal box 97 formed of a phenolic resin or the like. Suitable rivets 98 (FIGS. 5, 6, 7 and 8) preferably secure the terminal box to the base 28. The box 97 is designed with integral tubular sleeves 97a to enclose two rivets and to insure proper insulation thereof. Mounted within the terminal box 97 are a pair of identical toaster terminals designated as 100a and 100b. These toaster terminals are somewhat U-shaped and are secured in position by suitable rivets 101 (FIGS. 2, 5, 6 and 7). The two conductors of the power cord 40, designated as 40a and 40b, are connected to the terminals 100a and 100b, respectively. These toaster terminals 100a and 100b each include at the top thereof a lateral projection supporting an upwardly directed stationary contact 102a and 102b (FIGS. 2, 7 and 13). The stationary contacts 102a and 102b are part of a pair of carriage controlled switches including movable contacts 103a and 103b each mounted at an intermediate portion of an associated resilient switch arm 105a and 105b, respectively. These switch arms 105a and 105b extend along the top of box 97 and are each secured at their remote ends, as described hereinafter. The free ends of arms 105a and 105b extend toward each other and project into a central notch 106 defined in the top wall of the switch box 97 directly below the switch actuating projection 66 (FIGS. 7 and 8). The arms 105a and 105b are resilient, and the free ends are inherently biased against the edges defining notch 106. Thus, when the carriage 63 is moved downwardly, as shown in FIG. 7 of the drawings, the switch actuating member 66 engages the free ends of resilient switch arms 105a and 105b and moves the contacts 103a and 103b into engagement with associated contacts 102a and 102b, respectively, or, in other words, closes a pair of carriage controlled switches.

The resilient switch arms 105a and 105b are each supported by a lateral projection 107a extending from the bight portion of one of a pair of identical associated U-shaped bus bars 107. These bus bars each include a securing projection 107b depending from the bight portion thereof for securing the same to the inside rear wall of switch box 97 by rivets 108. The bight portions of bus bars 107 are disposed within switch box 97, but the leg portions 107c and 107d of each bus bar project beyond the rear wall of switch box 97 into the vicinity of terminals 57a (FIG. 8). Specifically, the insulating switch housing 97 in addition to the central notch or cutaway portion 106 also has end notches 110 (FIG. 8). Thus the legs 107c project through end notches 110 and the legs 107d project through central notch 106 into the vicinity of the terminals 57a of the four heating units 31 and 32, it being obvious from FIG. 8 that the bus bar portions 107c extend into the vicinity of the terminals 57a of the outer heating units 31, and the bus bar portions 107d extend into the vicinity of the terminals 57a of the center heating units 32. In a device built in accordance with the present invention, the ends of the bus bar portions 107c and 107d each included an upwardly extending portion 107e which spot welded or otherwise electrically connected to the terminal 57a of the adjacent heating element 53.

To connect the four heating elements 53 in a desired series parallel relationship, the terminal 57b of each outside heating unit 31 is interconnected by insulated conductors 112 with the terminal 57b of the inner heating unit 32 associated with the opposite toasting chamber, as clearly shown in the schematic diagram of FIG. 10 of the drawings. It will be apparent that with this arrangement when the carriage controlled switches 102a–103a and 102b–103b are closed current will flow through the two heating elements of one toasting chamber, such as 29 or 30, in parallel, but the heating element of one toasting chamber is connected in series with the opposite heating element of the other toasting chamber.

In order to make sure that the insulated conductors 112 do not interfere with the carriage mechanism 62, the upper ends of the carriage guide flanges 50e are preferably provided with integral finger members 50k, best shown in FIGS. 2 and 3 of the drawings, whereby these insulated conductors may be disposed in the pocket provided between these fingers 50k and the remainder of the upper portion of the flanges 50e. So that the central heating units 32 may be interchangeable, these fingers 50k are provided at the upper ends of all of the flanges 50e, but obviously those remote from the control end of the toaster have no function.

From the above description, it will be apparent that if the power cord 40 is plugged into a source of electrical energy, the heating elements 53 will be energized whenever the switches 102a–103a and 102b–103b are closed, which, of course, will be whenever the carriage is moved to its toasting position. The heating elements will be deenergized whenever the carriage is moved out of its toasting position.

In order automatically to energize the solenoid winding 94 to terminate a toasting operation, winding 94 of solenoid latch mechanism 92 is connected across the power source when switches 102a–103a and 102b–103b are closed and a switch controlled in response to the condition of the bread slice being toasted is closed. Specifically, there is provided a conductor 114 which interconnects one end of the solenoid winding 94 with one of the bus bars 107 and conductors 115 and 116 which interconnect the other bus bar 107 with the other end of solenoid winding 94 through the contacts 117a and 117b of a switch 117, the operation of which is described in detail hereinafter.

As disclosed in Koci Patent No. 2,667,828, granted Feb. 2, 1954, and assigned to the same assignee as the present application, a very satisfactory way to determine the toasting interval so that uniform toasting of a plurality of bread slices during successive toasting cycles of the toaster is obtained is to employ a device responsive to the surface temperature of the bread slice being toasted. With this type of arrangement, a uniform degree of toasting is obtained under any and all operating conditions regardless of the type of bread, the degree of dryness, or other similar factors. The toaster disclosed in the above-mentioned Koci patent has been extensively sold and has proven to be very satisfactory. In accordance with the present invention, the switch 117 controlling the solenoid latch mechanism 92 is, in turn, controlled by a surface temperature responsive thermostat and color control subassembly, generally indicated at 118 and best shown in FIGS. 11 and 12 of the drawings. The contacts 117a and 117b of the switch 117 form a part of this subassembly. As best shown in the drawings, this subassembly comprises a somewhat L-shaped thermostat bracket 119 having a normally vertically disposed portion 119a for location in the toasting chamber 30, as best shown in FIGS. 2 and 5 of the drawings. Thermostat bracket 119 also includes a portion 119b normally disposed in a horizontal plane and adapted to be fastened to the underside of the center or inner heating unit support 28b by a single screw or fastening means 120, best shown in FIG. 9 of the drawings, which extends through an opening 121 (FIG. 11) in the bracket 119. This screw 120 provides the means for securing the entire subassembly 118 in operating position in toaster 20. So that this single screw 120 may hold the subassembly 118 in this predetermined position, the portion 119b of the bracket 119 is preferably provided with a projecting finger 119c receivable in a notch 122 (FIG. 9) in one of the downturned edges of the base portion 28b.

For the purpose of supporting the contacts 117a and 117b of the latch control switch 117 in insulated relationship as a part of the subassembly 118, there is provided an insulating support 123, preferably formed of porcelain or other insulating material which will withstand the relatively high heat to which it is subjected. Insulator support 123 is secured as by means of a rivet 124 to the portion 119b of the thermostat bracket 119. So that this single rivet 124 may secure the insulator support 123 to the bracket 119 in a nonrotative manner, the insulator support 123 is provided with a projection 123a engaging a portion of the edge of support bracket portion 119b. Additionally, the support bracket is provided with deformed fingers 119d (FIGS. 9, 11 and 12) which engage an edge of insulating support 123.

It will be understood dthat energy radiated from the surface of a bread slice being toasted is relatively small. Also, inasmuch as the thermoresponsive device described embodies a constrained bimetallic configuration, the resultant output motion and energy are quite small. In view of this, the movable contact 117b is in the form of a small diameter wire, of suitable contact material, in order to minimize contact area and maximize contact pressure. In a device built in accordance with the present invention, contact 117b comprised an erosion resistant conductor wire welded to a short leg 126a of a very resilient L-shaped switch arm 126. The contact 117b is on the free end of this resilient switch arm, the other end of which arm is spot welded to an L-shaped conductor 128, one arm of the L being disposed within a recess 129 defined in insulating support 123 and secured thereto by a suitable rivet 130. The conductor 115 (FIGS. 9 and 10) interconnecting the switch 117 and the bus bar 107 connected to the switch 102b–103b is suitably spot welded to the other leg of the L-shaped conductor 128.

The contact 117a of the switch 117 might be referred to as the stationary contact, although it is movable for color control purposes described hereinafter. It is mounted on a switch supporting arm 132 much less flexible than the switch arm 126, but disposed in spaced parallel relationship therewith. The contact 117a is supported on the free end of switch arm 132. The other end thereof is provided with a lateral projection 132a disposed in a recess 133 in insulating support 123 and also held in this recess by a suitable rivet 135. The conductor 116, best shown in FIGS. 2, 9 and 10 of the drawings, is spot welded to the fixed end of switch arm 132. The inherent resilience of the switch arm 132 is such as to tend to move away from the contact 117b, while the switch arm 126 tends to assume a position spaced from the contact 117a but readily movable with a very small force so contact 117b may engage contact 117a. So that conductor 116 does not interfere with carriage mechanism 62, the former is held against base portion 28f by a finger 28k (FIG. 2) integral with this base portion.

To selectively position the stationary contact 117a for color control purposes, there is provided a color control arm 136 which has an intermediate portion thereof pivotally supported to the thermostat bracket 119. As best shown in FIGS. 9, 11 and 12 of the drawings, the thermostat bracket 119 includes a depending portion 119e. A resilient sheet spring member 137 is spot welded to the portion 119e and to an intermediate portion of color control arm 136. The end of color control arm 136 adjacent stationary contact 117a is provided with calibration means comprising an adjusting screw 138 threadedly engaging a tapped opening in color control bar 136. A tension nut 139 is also provided to make sure that any selected adjustment remains fixed. Mounted on the end of adjusting screw 138 is an insulating member 140 adapted to engage the free end of switch arm 132 on the opposite side thereof from that to which the stationary contact 117a is secured. When the subassembly 118 is mounted in the toaster 20, a projection 136a of the color control arm 136 extends through an opening 142 (FIGS. 3 and 4) in portion 28d of the base 28 into close proximity with the color control cam 88. Preferably, the end of portion 136a is provided with a cam follower deformation 136b (FIG. 9) so that rotation of the cam 88, which has a noncylindrical configuration, will cause movement of relatively rigid color control bar 136 about its pivoted connection 137 with thermostat bracket 119.

From the above description, the purpose of the notch 60 described above, provided on the base portion 28b and in the lower frame 50b, becomes apparent, since it permits the vertical supporting portion 119a of bracket 119 to extend upwardly within the toasting chamber 30 between two of the bread guides 50c and spaced from a bread slice disposed in this toasting chamber. When the subassembly is secured in position by the single mounting screw 120, the vertical support portion 119a of bracket 119 is orientated with the narrow edge thereof toward the bread slice disposed in toasting chamber 30 on the one side, and the heating element 53 of the heating unit 32 on the other side. With this arrangement, the support 119a will shade a minimum portion of the bread surface from the heating element. The portion 119b is disposed in good heat conducting relationship with the base portion 28b whereby this base portion serves to dissipate heat transmitted to the bracket 119 from the heating element adjacent thereto in the toasting chamber 30 as well as from other heat sources.

In accordance with the present invention, a surface temperature responsive member is secured to the upper end of the bracket 119. As illustrated, a bimetallic element 145 in the form of an elongated strip has the lower end thereof secured to the upper end of bracket 119 with the wide portion of the strip disposed essentially parallel to a bread slice disposed in the toasting chamber 30. The high expansion side of the bimetal 145 is disposed toward the bread slice, and the upper portion 145a of the bimetal might be characterized as the control or switch actuating portion, while the lower portion 145b is the compensating portion (FIG. 12). The bottom of the compensating portion 145b is firmly secured to the rigid thermostat bracket 119, preferably by a combined staking and welding operation generally designated at 146. To also secure the upper end of the bimetal 145 and to shield the same against direct radiation from the adjacent heating element 53, there is provided a shielding and support strip 147 which has its lower end firmly secured as by a staking and welding operation, designated at 148 (FIG. 11) to the upper end of thermostat bracket 119. The upper end of the shield 147 is welded to the upper end of the bimetal 145. So that the elements 145 and 147 are disposed in generally spaced parallel relationship, the upper end of the bimetal is provided with an L-shaped extension 145c, one leg of this L-shaped extension being welded to the shield 147. In a device built in accordance with the present invention, the shield 147 was at least as wide as the bimetal 145 and was made of stainless steel. For the desired compensating action, the compensating portion 145b of the bimetal 145 is narrowed somewhat, the particular amount of which is determined experimentally. If the compensating portion 145b is too wide, overcompensation is obtained; and if too narrow, undercompensation is obtained. If desired, the face of the portion 145a of the bimetal exposed to the bread slice may be blackened to increase the absorption of radiant energy.

In accordance with the present invention, the central portion of the bimetal 145 is connected to an L-shaped switch operating and motion multiplying member 150, the lower end of which is connected to an insulating member 151 adapted to engage resilient switch arm 126 when deflected in one direction to cause closing of the switch 117.

With the subassembly 118 embodied in the toaster 20, upon energization of the heating elements 53 with a bread slice disposed in toasting position in toasting chamber 30, radiant energy from the surface of the bread slice will be transmitted to the bimetal 145. If more heat is applied to portion 145a than to portion 145b, the bimetal 145 will tend to assume a shallow S-shaped form with the blackened surface described above defining the convex portion of the S, as viewed from the side, and the compensating portion forming the concave portion of the S. Such movement will cause the motion multiplying switch arm 150 to close the switch 117. If more heat were applied to portion 145b than to portion 145a, the bimetal 145 will again assume a shallow S-shaped form but reversed with respect to that described above so as to move arm 150 in a nonswitch closing direction. This can be demonstrated by applying heat from a lighted match to the portion 145a resulting in almost instant closing of switch 117. On the other hand, if one applied heat in the same manner to the portion 145b, the switch actuator 150 would move in a direction opposite to that necessary to close the switch. The theory of operation of the bimetal 145 is similar t that disclosed in Koci Patents Nos. 2,390,947 and 2,390,948, both granted Dec. 11, 1945, and assigned to the same assignee as the present application, with particular reference to those embodiments disclosed in these Koci patents where the bimetal is secured at both ends. Although only a relatively small motion occurs at the junction between the bimetal portions 145a and 145b to which the switch actuating arm 150 is secured, this motion will be greatly multiplied by virtue of the length of the actuator 150 and substantial movement will occur at the lower end thereof.

It will be apparent that the termination of the toasting cycle will be controlled only from the toasting chamber 30, and if a single slice of bread is to be toasted, it should be placed in this toasting chamber. It is for this reason that the panel 24a of the shell 24 is provided with the indicia "ONE SLICE" adjacent the bread slot 27, as shown in FIG. 1 of the drawings.

In order that successive slices of bread may be toasted in the toaster 20, means for rapidly cooling the portion of bimetal 145a are preferably provided. As illustrated, the finger 63f of bread rack 63 has secured to the end thereof a somewhat Z-shaped upwardly directed resilient heat conducting member 152 which moves with the rack 63 and slides along the portion 119a of the bracket 119 and along the bimetal 145 in good heat conducting engagement therewith. When the carriage is in the upper or bread receiving position best shown in FIG. 5 of the drawings, this heat conductor 152 is in engagement with the portion 145a of the bimetal 145 and rapidly conducts this heat stored in the bimetal to the bread rack 63 thereby cooling portion 145a of the bimetal. When the carriage is in its lower or toasting position as shown in FIG. 6 of the drawings, the conductor 152 is in contact with the bracket 119a. In order to protect the resilient heat conductor 152 from accidental deformation from its selected shape, the finger 63g of the bread rack 63 projects adjacent the back thereof, as best shown in FIG. 8 of the drawings, to limit the maximum deflection away from the bimetal.

In view of the detailed description, the operation of the toaster of the present invention will readily be understood, particularly with reference to FIG. 10, where the corresponding parts thereof are designated by the same reference numerals as in the other figures of the drawings. When the toaster is manufactured, the color control mechanism is calibrated by properly adjusting the screw 138, and then the operator may selectively adjust the desired toast color by manipulating the knob 91. Upon inserting bread slices into the bread receiving slots 26 and 27, the operator can move the same to the toasting position by merely depressing the knob 79 until it is latched in its lower position. This action will cause the carriage controlled switches 102a–103a and 102b–103b to close by virtue of the projection 66 on the carriage or bread rack 63. This will energize the heating elements 53, as is readily apparent from FIG. 10 of the drawings. When the desired toasting is accomplished, the bimetal 145 will cause actuation of the switch 117 to the closed position thereby energizing solenoid latch mechanism 92 releasing the carriage, which opens the switches and deenergizes the heating elements. Quick cooling of the bimetal 145 occurs by virtue of the resilient conductor 152 which moves into engagement therewith so that the toaster is immediately ready for toasting successive bread slices. By virtue of the compensating portion 145b of the bimetal 145 as the ambient temperature in the toaster increases, the toasting interval decreases but uniform toasting, regardless of the ambient temperature is obtained.

While there has been shown and described a particular embodiment of the present invention, it will be apparent to those skilled in the art that various changes and modifications may be made without departing from the invention in its broader aspects, and it is, therefore, contemplated in the appended claims to cover all such changes and modifications as fall within the true spirit and scope of the invention.

What is claimed as new and desired to be secured by Letters Patent of the United States is:

1. An electric toaster comprising a support, a pair of heating units mounted on said support and defining a heating chamber therebetween, and means for automatically terminating a heating cycle comprising thermostatically controlled switch means mounted on said support, said thermostatically controlled switch means comprising a bracket having a portion extending into said chamber and an elongated bimetallic element having one end thereof rigidly secured to the end of said bracket, said bimetallic element being movable in a plane normal to the plane of a bread slice disposed in said chamber, said bimetallic element having its high expansion side disposed to face and receive direct radiation from a bread slice in said chamber, said bimetallic element including one portion of substantial width primarily responsive to the radiant energy emitted from the surface of said bread slice and a compensating other portion, a combined restraining and shielding element having one end secured to said end of said bracket and its other end secured to said bimetallic element whereby said elements are disposed in spaced relationship, said shielding element shielding said bimetallic element from the adjacent heating unit.

2. The toaster of claim 1 wherein said switch means is normally open and includes a movable contact, and an elongated motion multiplying actuating arm having a free end movable toward and away from said movable contact, said actuating arm having its other end secured to an intermediate portion of said bimetallic element whereby heating of said one portion of said bimetallic element by radiation emitted from said bread slice causes movement of said actuating arm in a direction to move said movable contact to a switch closing position, while heating of the other portion of said bimetallic element tends to cause motion of said actuating arm in an opposite direction.

3. In an electric toaster including a pair of spaced apart upstanding heating units defining a toasting chamber therebetween, a bread carriage disposed to move between said heating units for supporting a bread slice and moving it between an upper bread receiving position and a lower toasting position between said heating units, normally open switch means mounted in said toaster having one contact movable to close said switch means and terminate the heating cycle of said toaster, radiant energy responsive thermostatic means for closing said switch means, said thermostatic means including a bracket mounted in said toaster and extending into said chamber, a bimetallic element disposed in said chamber having one end rigidly secured to the upper end of said bracket, said bimetallic element being movable in a plane normal to a bread slice supported on said carriage, said bimetallic element having its high expansion side disposed to face and receive radiant energy directly from said bread slice, said bimetallic element including an upper portion of substantial width primarily responsive to the radiant energy received from the surface of a toasting bread slice and a compensating lower portion of reduced width, a combined restraining and shielding member having its lower end secured to the upper end of said bracket and its upper end secured to said bimetallic element, said shielding member extending upwardly between said bimetallic element and the adjacent heating unit, said shielding member being at least as wide as the width of said bimetallic element to shield the latter from direct radiation from said adjacent heating unit, and an elongated downwardly depending motion multiplying actuating arm having a free lower end movable toward and away from said movable contact of said switch means, said actuating arm having its upper end secured to an intermediate portion of said bimetallic element whereby heating of the upper portion of said bimetallic element by radiation from the surface of the toasting bread slice causes movement of said actuating arm in a direction to close said switch means while heating of the lower portion of said bimetallic element tends to cause motion of said actuating arm in the opposite direction.

4. In an electric toaster including a pair of spaced apart upstanding heating units forming opposite side walls of a bread receiving toasting chamber, a bread carriage disposed to move between said heating units for supporting a bread slice in a lower toasting position wherein opposite sides of the slice are facing and spaced from respective ones of said heating units and movable to an upper bread receiving position, normally open switch means having one contact movable to close said switch means at the end of a heating cycle of said toaster, radiation responsive thermostatic means for closing said switch means after a selected amount of toasting of the bread slice in said chamber, said thermostatic means including an upstanding bimetallic element carried on an upper end of a support bracket, said bimetallic element being movable in a plane normal to the plane of a bread slice in toasting position and having its high expansion side disposed to directly face and receive direct radiation from said bread slice, said bimetallic element including an upper portion of substantial width primarily responsive to the heat radiation from the surface of the toasting bread slice and a lower portion of reduced width having its lower end rigidly secured to the upper end of said bracket, a shielding member secured to the upper end of said bracket and extending upwardly between said bimetallic element and the adjacent heating unit for shielding said element from direct radition from said adjacent heating unit, said shielding member having its upper end rigidly secured to the upper end of said bimetallic element, an elongated downwardly depending motion multiplying actuating arm having a free lower end movable toward engagement with and away from said movable contact of said switch means, said actuating arm having its upper end secured to an intermediate portion of said bimetallic element whereby heating of said upper portion of said bimetallic element causes movement of said actuating arm in a direction to cause the lower end thereof to move said movable contact to a closed switch position, while heating of said lower portion of said bimetallic element causes compensating movement of said actuating arm in an opposite direction.

5. The toaster of claim 3 wherein bimetallic element cooling means are provided secured to said bread carriage including an upwardly directed resilient member biased into contacting engagement with said bimetallic element when said carriage is in said bread receiving position and movable into contacting engagement with said bracket when said carriage is in said toasting position.

6. The toaster of claim 5 wherein means are provided on said carriage to limit the maximum deflection of said resilient member.

7. A heat responsive switch means for use in automatically terminating the toasting operation of an electric toaster in response to the radiant energy emitted from one side of a bread slice being toasted, comprising a subassembly including a generally horizontally disposed insulated support, a rigid bracket secured to said support and including a portion extending upwardly therefrom, an elongated bimetallic element having its lower end rigidly secured to one edge of the upper end of said bracket, the plane defined by one side of said bimetallic element being generally perpendicular to the plane defined by one side of said upwardly extending portion of said bracket, an elongated shielding strip having its lower end rigidly secured to the opposite edge of the upper end of said bracket, said shielding strip being at least as wide as said bimetallic element and disposed in spaced generally parallel relationship therewith, means for rigidly securing together the upper ends of said bimetallic element and said shielding strip, a pair of contact arms disposed in a generally horizontal position and supported from said support a substantial distance below said bimetallic element, a switch comprising a pair of switch contacts each supported by a different one of said contact arms, one of said contact arms being movable toward said other contact arm to close said switch, an elongated arm having its upper end secured to an intermediate portion of said bimetallic element and extending downwardly into the vicinity of said one contact arm whereby a very small deflection of the portion of said bimetallic element to which said arm is secured in response to radiant energy emitted from said bread slice causes substantial movement of the lower end of said arm to close said switch.

8. A heat responsive switch means for use in automatically terminating the toasting operation of an electric toaster in response to the radiant energy emitted from one side of a bread slice being toasted, comprising a subassembly including a generally horizontally disposed insulated support, a rigid bracket secured to said support and including a portion extending upwardly therefrom, an elongated bimetallic element having its lower end rigidly secured to one edge of the upper end of said bracket, the plane defined by one side of said bimetallic element being generally perpendicular to the plane defined by one side of said upwardly extending portion of said bracket, an elongated shielding strip having its lower end rigidly secured to the opposite edge of the upper end of said bracket, said shielding strip being at least as wide as said bimetallic element and disposed in spaced generally parallel relationship therewith, means for rigidly securing together the upper ends of said bimetallic element and said shielding strip, an elongated arm having its upper end secured to an intermediate portion of said bimetallic element, and switch means actuated by the lower end of said arm whereby a very small deflection of said bimetallic element in response to radiant energy emitted from a bread slice being toasted causes substantial movement of the lower end of said arm to actuate said switch means.

References Cited
UNITED STATES PATENTS

| | | | |
|---|---|---|---|
| 1,984,063 | 12/1934 | Graham | 99—329 |
| 2,099,210 | 11/1937 | Ireland | 99—329 |
| 2,301,070 | 11/1942 | Myers | 99—329 |
| 2,796,492 | 6/1957 | Lawser. | |
| 2,849,946 | 9/1958 | Palmer | 99—390 |
| 2,865,279 | 12/1958 | Palmer | 99—329 |
| 2,901,965 | 9/1959 | Chivers | 99—329 X |
| 2,910,929 | 11/1959 | Sorenson | 99—329 X |
| 3,035,509 | 5/1962 | Lawser | 99—329 |

BILLY J. WILHITE, *Primary Examiner.*